United States Patent [19]
Soby et al.

[11] Patent Number: 5,354,812
[45] Date of Patent: * Oct. 11, 1994

[54] TERNARY ALLOYS OF POLY(VINYL CHLORIDE) WITH HIGH HEAT DISTORTION TEMPERATURES

[75] Inventors: Lynn M. Soby, Brecksville; Marvin H. Lehr, Akron; Elmer D. Dickens, Jr., Richfield; Murali Rajagopalan; William S. Greenlee, both of Avon Lake, all of Ohio

[73] Assignee: The B. F. Goodrich Company, Akron, Ohio

[*] Notice: The portion of the term of this patent subsequent to Dec. 28, 2010 has been disclaimed.

[21] Appl. No.: 973,011

[22] Filed: Nov. 6, 1992

Related U.S. Application Data

[63] Continuation-in-part of Ser. No. 697,817, May 9, 1991.

[51] Int. Cl.5 .............................................. C08L 27/06
[52] U.S. Cl. .................................... 525/239; 525/235; 525/238; 525/240; 525/242; 525/243
[58] Field of Search ................ 525/239, 235, 238, 240, 525/242, 243

[56] References Cited

U.S. PATENT DOCUMENTS

| | | |
|---|---|---|
| 2,230,000 | 1/1941 | Hauffe et al. . |
| 3,341,628 | 9/1967 | Buning et al. . |
| 3,470,269 | 9/1969 | Dobovsek . |
| 3,555,122 | 1/1971 | Simons . |
| 3,660,320 | 5/1972 | Johnson et al. . |
| 3,678,132 | 7/1972 | Isagawa et al. . |
| 3,696,956 | 10/1972 | Merrill et al. . |
| 3,711,576 | 1/1973 | Hwa . |
| 3,766,106 | 10/1973 | Yurimoto et al. . |
| 3,796,776 | 3/1974 | Ide et al. . |
| 4,054,615 | 10/1977 | Hardt . |
| 4,160,793 | 7/1979 | Kraft . |
| 4,267,084 | 5/1981 | Mizutani et al. . |
| 4,304,884 | 12/1981 | Okamoto . |
| 4,647,626 | 3/1987 | Lehr . |
| 4,665,118 | 5/1987 | Bourland . |
| 4,668,740 | 5/1987 | Okano . |
| 4,710,533 | 12/1987 | Neuman . |
| 4,745,156 | 5/1988 | Yoshihara et al. . |
| 4,847,331 | 7/1989 | Lehr . |
| 4,914,154 | 4/1990 | Haller et al. . |
| 5,086,122 | 2/1992 | Lawson et al. ............ 525/239 |

FOREIGN PATENT DOCUMENTS

| | | |
|---|---|---|
| 92201180 | 7/1992 | European Pat. Off. . |
| 2110157 | 4/1990 | Japan . |
| 2142845 | 5/1990 | Japan . |
| 53523 | 4/1967 | Luxembourg . |
| 6711154 | 2/1968 | Netherlands . |

OTHER PUBLICATIONS

An article entitled "The Effect of Hydrogen Bonding To the Glass Transition Temperatures of Polymer Mixtures" from *Journal of Polymer Science*, Polymers Letters Edition, vol. 22, 307–313 (1984), J. Wiley & Sons, Inc.

An article entitled "Rheological and Mechanical Properties of Poly(Vinyl Chloride)/Chlorinated Poly(Vinyl Chloride) Miscible Blends," M. H. Lehr, *Polymer Engineering and Science*, Jul. (1986), vol. 26, No. 13, pp. 947–956, J. Wiley & Sons, Inc.

(List continued on next page.)

*Primary Examiner*—John Kight, III
*Assistant Examiner*—Duc Truong
*Attorney, Agent, or Firm*—Hudak & Shunk Co.

[57] ABSTRACT

Ternary alloys of PVC/CPVC/alloying polymers are disclosed which make use of the unexpected results of interactions between alloying polymers and CPVC and PVC, interactions which result in higher heat distortion temperatures than predictable by linear addition of the properties of the binary blends of PVC/CPVC and PVC/alloying polymer systems. This effect allows replacement of substantial amounts of alloying polymer with a predetermined amount of CPVC without changing substantially HDT or melt viscosity. Such effects allow the use of these ternary alloys in place of binary PVC/alloying polymer systems in injection molding and extrusion applications.

20 Claims, 1 Drawing Sheet

TERNARY ALLOYS OF POLY(VINYL CHLORIDE) WITH HIGH HEAT DISTORTION TEMPERATURES

CROSS REFERENCE

This application is a continuation-in-part application of U.S. application Ser. No. 07/697,817, filed May 9, 1991, having the title of "Chlorinated PVC Blends."

FIELD OF INVENTION

This invention relates to ternary alloys of poly(vinyl chloride), chlorinated poly(vinyl chloride) (CPVC), and alloying polymers, in particular, ternary alloys exhibiting two phases are disclosed in which part of the alloying polymer in the binary alloy has been replaced with chlorinated poly(vinyl chloride) (CPVC) to give substantially the same heat distortion temperature (HDT) as a binary alloy of PVC/alloying polymer having greater amounts of alloying polymer. Such ternary alloys are useful for injection molding or extrusion of rigid articles having improved combination of properties.

BACKGROUND

Though poly(vinyl chloride) is a polymer of wide commercial use, it is known to have inadequate rigidity or heat distortion temperature above 75° C. To overcome this deficiency in PVC, alloying polymers of higher heat distortion temperatures than PVC have been blended with PVC to produce binary alloys having a HDT intermediate between that of PVC and that of the alloying polymer. Such alloying polymers, for example an imidized poly(methyl methacrylate) (HT510 from Rohm and Haas), can form a miscible blend with PVC, an alloy which is characterized by a single phase having a single glass transition temperature (Tg) intermediate between that of the PVC and that of the alloying polymer. Other alloying polymers, for example, form partially miscible blends with PVC, an alloy in which case two phases occur, a lower Tg phase having a major portion of the PVC and a minor portion of alloying polymer, and a higher Tg phase having a major portion of alloying polymer and minor portion of PVC.

Alloying polymers that are effective in forming miscible or partially miscible blends with PVC have generally little or no chlorine in their chemical structures so they are flammable, in contrast to PVC, which is known to be resistant to burning and which is often used in applications where good flame resistance is needed. Thus, blending an alloying polymer with PVC decreases PVC flame resistance. Furthermore, because most alloying polymers tend to be more brittle than PVC, their addition to PVC causes an increase in brittleness of the PVC binary alloy. This usually requires adding more impact modifier to maintain adequate impact strength in the PVC alloy. Since one of the main purposes of making PVC alloys is to increase HDT, it is therefore commercially desirable to overcome the deficiencies which usually accompany the formation of such binary alloys.

Recent disclosures illustrate the use of alloying polymers with PVC or CPVC in binary blends. U.S. Pat. No. 4,255,322 discloses blends containing vinyl chloride polymers and copolymers with polyglutarimides with the weight ratio of said polymers of 5:95 to 95:5. These compatible blends are claimed to have improved heat distortion temperatures and are impact modifiable. The vinyl chloride polymers can be poly(vinyl chloride), chlorinated poly(vinyl chloride) or poly(vinyl chloridevinyl acetate).

U.S. Pat. No. 4,745,156 discloses blends composed of 55-75 weight percent poly(vinyl chloride) polymers and 10-30 weight percent α-methyl styrene/acrylonitrile copolymer. The remainder may include impact modifiers. The said poly(vinyl chloride) polymer may include 5-50 parts chlorinated poly(vinyl chloride) having chlorine levels between 60 and 70%. The materials are said to possess improved vacuum and pressure forming properties. The said compositions have improved heat distortion temperature, high flame retardancy and chemical resistance when vinyl chloride polymer component is about 55 weight percent.

U.S. Pat. No. 4,847,331 discloses a CPVC compound comprising a blend of CPVC having a chlorine content of between about 60 percent and 66 percent by weight and a poly(methyl methacrylate) comprising not more than 80 percent by weight of the blend. The composition of matter displays homogeneous, substantially single phase behavior with the CPVC and poly(methyl methacrylate) being substantially or completely miscible. The resulting blended material exhibits enhanced temperature and durability properties and remains homogeneous up to a temperature of 230° C.

U.S. Pat. No. 4,647,626 discloses a blend of CPVC having chlorine content between 60 percent and 67 percent by weight and a styrene-acrylonitrile (SAN) copolymer having acrylonitrile content between 15 percent and 25 percent by weight. A single homogeneous phase is presumed from a single glass transition endotherm.

U.S. Pat. No. 4,710,533 discloses a CPVC blend including the aforementioned SAN copolymer and a flow enhancing polymer such as alpha-methyl styrene. Impact modifiers such as ABS are also suggested.

SUMMARY

A three component alloy is described generally comprising poly(vinyl chloride), chlorinated poly(vinyl chloride), and one or more alloying polymers. An alloying polymer is soluble (miscible) or partially soluble (partially miscible) with either PVC or CPVC or both. The effect of the interaction of the alloying polymer with CPVC is to enhance heat distortion temperature (HDT) more than would be predictable for such a ternary alloy, based on the properties of binary blends of PVC/CPVC and PVC/alloying polymer systems and the proportions of these binary blends in the ternary alloy. As a result of this effect between alloying polymer and CPVC, it is possible to replace a substantial weight fraction of the alloying polymer with CPVC with essentially no loss in HDT. The higher than predictable heat distortion temperatures or lower than predictable apparent melt viscosities that are measured in the ternary alloys are due to the unexpected result of interactions between the polymeric components either singly or an multiple interactions. The results of such interactions cannot be explained by the non-linear property behavior of the binary blends of PVC/CPVC and PVC/alloying polymer systems.

It has been discovered that to achieve heat distortion temperatures in the ternary alloy which are greater than those predictable from simple addition of values for binary blends of PVC/CPVC and PVC/alloying polymer, it is essential that the heat distortion temperature for the binary alloy of CPVC and alloying polymer be greater than those predictable from simple additivity or linearity. We assume that this effect arises from the interactions between the CPVC and alloying polymer which are stronger than those that exist between PVC and alloying polymer. Whatever the reasons for this HDT behavior, we assume that the effects are carried over into the ternary alloys. The ternary alloys of this embodiment are described in the Further Detailed Description, Ternary Alloys. The Detailed Description describes a previous embodiment of PVC, CPVC, and optional flow enhancers or Tg enhancers.

DETAILED DESCRIPTION

Figure 1:
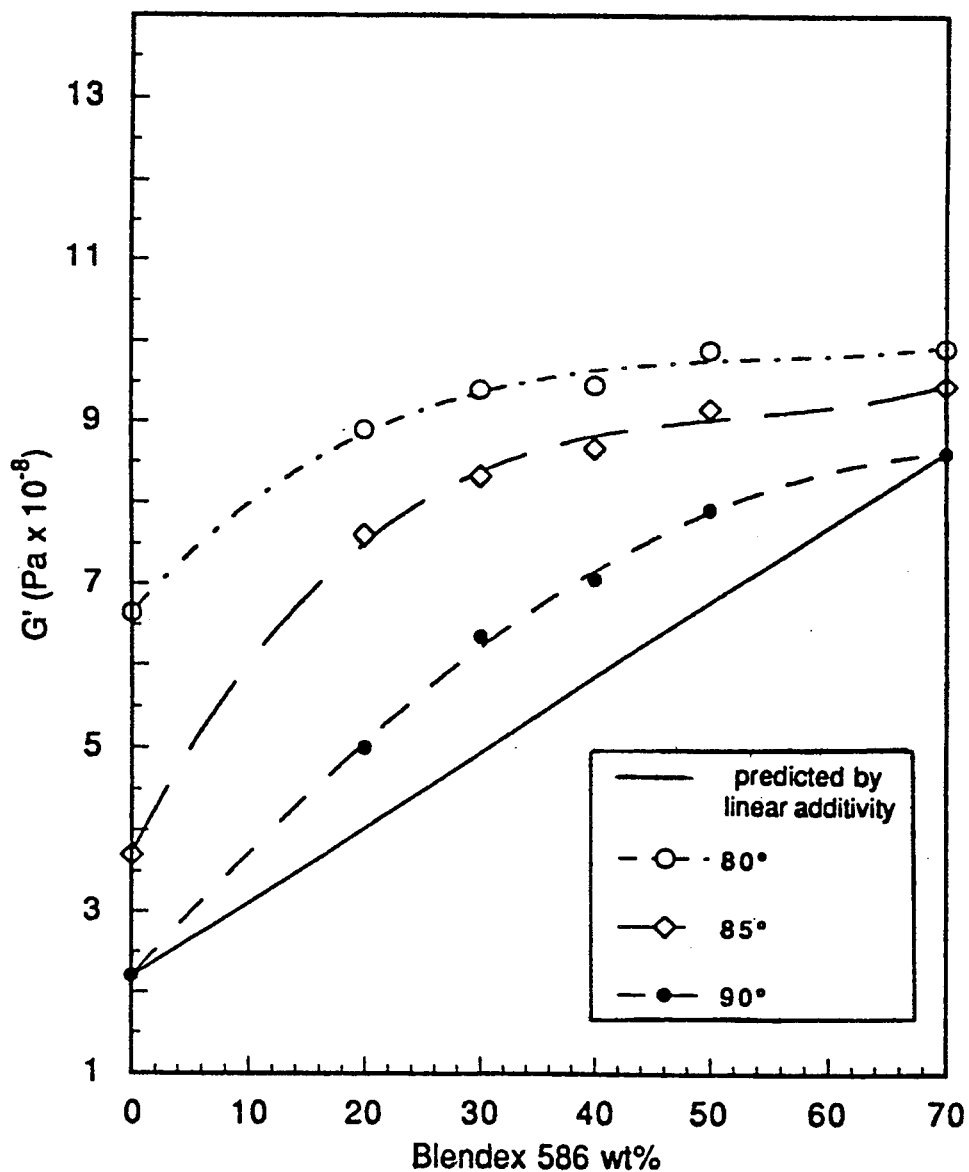
FIG. 1 shows the Shear Modulus of ternary compositions of PVC/CPVC/Blendex ® 586 at 30 wt. percent PVC at temperatures of 80° to 90° C. in 5° C. increments. These compositions show the nonlinear behavior of the shear modulus at temperatures from 80° to 90° C.

Post-chlorinated PVC (CPVC) is defined for this invention as generally containing from higher than about 57 percent to less than about 78 percent by weight (wt. %) of bound chlorine. Commercially available CPVC generally contains greater than about 57 percent by weight of chlorine, and is most prevalent in the range from about 60 percent to 66 percent by weight of chlorine. CPVC used in the invention desiredly contains from about 60 percent to about 70 percent by weight and preferredly from about 63 percent to about 68 percent chlorine by weight. There are practical limitations in the use of chlorinated PVC having higher than about 70 percent by weight of chlorine.

As a direct indication of molecular weight, the inherent viscosity of the precursor PVC which is post-chlorinated can range from about 0.2 to about 2.0 I.V. or higher. A preferred I.V. is in the range of from 0.3 to 1.0 with the most preferred I.V. in the range of from 0.40 to 0.65. A practical limit is reached with CPVC derived from a high I.V. precursor PVC wherein difficulty is encountered with fusion, flow and degradation at melt processing temperatures. A CPVC derived from a precursor PVC having an I.V. higher than about 2.0 is not desired for use with the present blends. It is understood that throughout this specification, I.V. specified for a CPVC means the I.V. of the precursor PVC for said CPVC.

Techniques for post-chlorination of PVC are illustrated, for example, in U.S. Pat. No. 4,377,459 which discloses a liquid chlorine method. The use of CPVC prepared in any suitable or conventional manner is contemplated as within the purview of this invention.

Poly(vinyl chloride) polymers referred to in this specification include poly(vinyl chloride) homopolymers, vinyl chloride copolymers, graft copolymers, vinyl halide polymers polymerized in the presence of any other polymer such as a high heat distortion temperature enhancing polymer, impact toughener, barrier polymer, chain transfer agent, stabilizer, plasticizer or flow modifier. For example, a combination of modifications may be made with the PVC polymer by over polymerizing a low viscosity, high glass transition temperature (Tg) enhancing agent in the presence of a chain transfer agent. Such a method is disclosed in U.S. Pat. No. 4,814,387 incorporated herein by reference. In an alternative embodiment, the vinyl chloride may be polymerized in the presence of said Tg enhancing agent, the agent having been formed prior to, or during the vinyl chloride polymerization.

Where the selected PVC is a vinyl chloride copolymer, any monomer copolymerizable with vinyl chloride and known in the art may be employed, thus, the practice of the present invention does not preclude selection of one or more than one comonomer. Such co-polymerizable monomers for PVC include acrylate esters, methacrylate esters, monoolefins, diolefins, styrene derivatives, acrylonitrile, vinyl esters, vinylidene chloride, vinyl ethers, and crosslinking comonomers such as allyl methacrylate, and diallyl phthalate. Preferred comonomers include ethylene, propylene, 1-butene, 2-butene, 1-pentene, 1-hexene, isobutylene and vinylidene chloride. The most preferred comonomers are ethylene, propylene, 1butene and isobutylene in minor proportions so as to not appreciably depress the HDT for the blend. The amount of comonomer that may be polymerized with vinyl chloride is a function of the choice of comonomer, as is well understood by those skilled in the art. Any poly(vinyl chloride) polymer. of this invention whether postchlorinated or not is most preferably a poly(vinyl chloride) homopolymer or copolymer with a minor amount of the most preferred comonomer(s).

The preparation of PVC resin is well established and therefore a detailed discussion is beyond the scope of this invention. The I.V. of PVC blended with CPVC can range from 0.4 to 2.5 or higher; preferably from 0.6 to 1.9, more preferably from 0.8 to 1.6 and most preferably from 0.9 to 1.05. A conventional PVC resin can be prepared by any known polymerization process such as, but not limited to suspension, mass, solution, emulsion, dispersion and microsuspension techniques. A preferred process for preparing conventional poly(vinyl chloride) resin for use in this invention is the aqueous suspension process and is disclosed in U.S. Pat. Nos. 4,659,791 ('791), 4,775,699, 4,797,458 and 4,871,780 incorporated herein by reference. The suspension process in '791 involves an agitated reaction medium during the entire reaction period. Water is the polymerization medium and a vinyl monomer to water ratio is selected in the range of about 1:1 to 1:10. Preferably, a vinyl monomer-water ratio in the range of about 1:1 to 1:4 is employed. The preferred suspension process to prepare the precursor PVC for said chlorinated poly(vinyl chloride) includes the use of hydroxypropyl methylcellulose dispersants. Preferably, a skinless PVC suspension resin may be used in the blends of the present invention. A method for preparing skinless PVC resins is disclosed in U.S. Pat. No. 4,711,908, incorporated herein by reference.

The particular inherent viscosities for the PVC used to make CPVC and PVC resins blended therewith are generally controlled during the polymerization of each said resin by polymerization temperature and/or by the use of chain transfer agents, both techniques being well known in the art.

Of particular importance to the present invention is the I.V. of the PVC relative to the I.V. of the PVC precursor for the CPVC as measured in a manner similar to ASTM-D1243. Each is selected within a particular Δ I.V. range in order to exhibit enhanced properties shown below by way of the examples.

Inherent viscosity is defined as the ratio of the natural logarithm of the relative viscosity of a resin and the concentration in grams of the solution used to measure the viscosity. A method similar to ASTM-D 1243-58T Method A is employed to determine inherent viscosity of an 0.2 g sample in 100 ml of cyclohexanone at 30° C. These values have been related to the polymerization degree (JIS K 6721) and weight average molecular weight of a polymer and are reported in *Plastics*, 28 98 (1963).

The novel approach of the present invention involves modifying CPVC preferably not with an incompatible flow enhancer which may require further impact modifier and compatibilizer, but with a minor amount of higher I.V. PVC. This approach provides a desired combination of properties with a reduced level of conventional impact modifier. In particular, a relatively high melt flow CPVC was blended with a PVC having higher I.V. than the PVC precursor for CPVC. This resulted in a reduction in the melt flow rate but not so severe as to limit practical processing of the blend. The reduction in melt flow rate was accompanied by unexpected improvements in tensile strength, elongation and impact toughness and was achieved without a significant loss in heat deflection performance. The preferred blends contain PVC having an I.V. at least about 0.2 units higher than the I.V. of the precursor PVC for CPVC and preferably a Δ I.V. of 0.2 to 1.0 I.V. with the most preferred Δ I.V. of from 0.35 to 0.65, the PVC blended therewith always having the higher I.V.. With this relationship acknowledged, a wide range of I.V. can be selected for the CPVC precursor resin component and the I.V. of the PVC blended therewith can be advantageously chosen thereby yielding the desired balance of properties. For example, a preferred CPVC polymer derived from a precursor PVC having an I.V. of from about 0.3 to about 1.0 can be selected in blends with a PVC polymer having the higher I.V. than the CPVC. The I.V. of the PVC which is optimum for a particular CPVC will be preferably from about 0.2 to about 1.0 I.V. units higher than the I.V. of the chosen CPVC.

Within the preferred CPVC and PVC Δ I.V. ranges, further variation of composition is contemplated by varying the weight ratio of CPVC and PVC. Generally, when a high heat distortion temperature is desired and the blend consists of a CPVC having the precursor PVC I.V. chosen according to the relationship given, the PVC blended therewith is preferredly present in amounts from 1 to about 100 weight parts, preferably between 1 and 70 weight parts, more preferably between 3 weight parts and 30 weight parts and most preferably from 5 to 15 weight parts of combined CPVC and PVC in the blend.

The Δ I.V. relationship observed for CPVC/PVC blends is unique in that the high degree of compatibility between each of these resins enables a toughened blend. The amount employed of PVC component is efficient in achieving desired improvements and at the same time heat distortion temperature is not appreciably sacrificed. Melt flow is not severely sacrificed and remains adequate for those blends which display an optimum balance of improved strength, impact resistance, HDT, weatherability and chemical resistance. Moreover, it is understood that conventional impact modifiers generally act as melt flow suppressants, therefore, with reduced levels of impact modifier required in the blends of the present invention, a relative gain in melt flow is achieved.

At a point where melt flow is reduced to a level which is inadequate for the intended molding processes and is evidenced by unacceptable spiral melt flow, an optional flow enhancing additive can be employed. Suitable flow enhancing additives are the aforementioned α-methyl styrene polymers, polypropylene, imidized PMMA, and low acrylonitrile containing SAN copolymers in addition to modifications which can be made to the PVC polymer itself outlined supra.

The CPVd/PVC blend can contain effective amounts each preferably ranging from 0.5 to about 15 parts by weight of other various compounding components known to the art as well as to the literature. For example, various external lubricants such as stearic acid, oxidized polyethylene, polypropylene, paraffin wax metallic salts of fatty esters including mixtures and the like can be utilized. Stabilizers for PVC and CPVC include barium/cadmium/zinc compounds, and as various organo-tins, for example, methyl,, -butyl, -octyltin carboxylates, mercapto-carboxylates, mercaptides, glycolates, thioglycotates and the like. Specific examples include dibutyltin-S-S'-bis(isooctylmercaptoacetate), dibutyltin dilaurate, with organo tin diisooctyl thioglycolates being preferred. Secondary stabilizers may be included, for example, phosphites, and metal salts of phosphoric acid. Specific examples of salts include water-soluble, alkali metal phosphate salts, disodium hydrogen phosphate, orthophosphates such as mono- di- and tri-orthophosphates of said alkali metals, alkali metal polyphosphates, tetrapolyphosphates and -metaphosphates and the like. Typical levels of secondary stabilizers range from about 0.1 wt. parts to about 7.0 wt. parts per 100 wt. parts halogenated polymers. In addition, antioxidants may also be incorporated such as phenolics, BHT, BHA, various hindered phenols, and various inhibitors such as substituted benzophenones can be utilized to provide oxidation resistance, U.V. resistance, etc.

Inasmuch as high impact values are often desired, additional impact modifiers may be incorporated, as noted above, and are known to the art as well as to the literature. For example, various impact modifiers can be utilized as set forth in *The Encyclopedia of PVC*, Volume 2, Chapter 12, Marcel Dekker, Inc., New York, 1977, which is incorporated herein by reference. Examples of commercially available impact modifiers include acrylonitrile-butadiene-styrene (ABS) polymers, chlorinated polyethylenes, acryiic rubbers, the various poly-(ethylene-co-vinyl acetates), styrene-butadienestyrene block copolymers, graft copolymers of methacrylate, butadiene, styrene (MBS), including mixtures thereof. Preferred impact modifiers include ABS, MBS, and chlorinated polyethylene. Regardless of the exact type of impact modifier utilized, the amounts thereof can vary depending upon the desired impact strength as typically measured by an Izod impact text (ASTM D256). The levels of impact modifier to achieve the desired impact strength can vary from about 1 to about 50 parts by weight, and more preferably from about 5 to about 20 parts by weight based upon 100 parts by weight of said combined CPVC/PVC blend. Most preferably impact modifier is present at from 5 to 12 weight parts per 100 weight parts of PVC/CPVC. Accordingly, the blends of the present invention have the capacity to be impact-modified to achieve notched Izod values generally in excess of 100 N.m/m (of notch), desirably in excess of 200 N.m/m and preferredly in excess of 230 N.m/m.

Various fillers, pigments and colorants can also be utilized in effective amounts. Fillers can be employed at levels of about 0 to about 300 parts by weight for every 100 parts by weight of the resin blend. Examples of fillers include calcium carbonate, clay, silica, various silicates, and talc. Examples of various pigments include rutile titanium dioxide, carbon black and the like. In Examples 7-9, 4.5 wt. parts of pigment were used. In Examples 10-22, 2.0 wt. parts were used.

Plasticizers may be included in any manner and amount. Exemplary plasticizers are set forth in *The Technology of Plasticizers*, by Sears and Darby, pages 893-1085, John Wiley and Sons, New York, 1982, which is incorporated herein by reference. Plasticizers are preferably present at levels less than 100 parts by weight of resin, more preferably less than 5 parts by weight, and most preferably absent.

The CPVC/PVC blend can be prepared along with the various additives, for instance, in a high speed powder mixing device, a Banbury mixer or the like, and then fused on a two-roll mill and cubed. The compound in a fused, cubed state can be subsequently calendered, extruded, or injection molded or processed by any suitable melt processing means. The vinyl chloride polymers can also be mixed with the various additives in a high intensity mixer such as a Henschel mixer and then processed on an extruder into pellets or directly into a finished article by way of a compounding extruder such as a Buss-Condux line. In general, any conventional means of compounding such as a Banbury mixer, two-roll mill, Henschel mixer, ribbon blender, compounding extruder, injection molding machine and the like can be used to prepare the compounds of this invention.

The blended compounds of the present invention can be processed by a variety of techniques including injection molding, extrusion, calendering, thermoforming, compression molding and the like to form end-use articles such as molded sheets, trays, shrouds as for fans, appliance parts and covers, electrical outlets, business machine housing, piping, telecommunication equipment, automotive components, and numerous others.

The invention will be better understood by reference to the following examples.

EXAMPLES 1-6

Example CPVC/PVC blend compounds were prepared to demonstrate the various features of the present invention by melt blending of a selected CPVC resin having an I.V. for the precursor PVC of 0.46 in combination with a PVC resin, each containing a different I.V. listed below. The following compound recipe was employed for Examples 1-6:

|  | Wt. Parts |
|---|---|
| CPVC (0.46 I.V., 68% chlorine) | 56 |
| PVC (Var. I.V.)[1] | 35 |
| Impact Modifier | 12 |
| Stabilizer[2] | 1.8 |
| Lubricants | 3 |

[1]Example 1-6 used I.V. of 0.46, 0.53, 0.68, 0.92, 1.0 and 1.6 respectively.
[2]Tin mercaptide stabilizer.

Examples 1-3 were mixed on a 160° C. Banbury mill and dumped at a stock temperature of 176° C. Examples 4-6 were mixed at 154° C. and dumped at 176° C. The blends were placed on a 2-roll mill for several passes, one roll heated to 160° C. and the other at 170° C. The milled sheets were then cubed. Injection molded standard test plaques were formed on a 75 ton Van Dorn molding machine. Testing of the molded specimens was performed by the following methods:

|  | Method | Units |
|---|---|---|
| Tensile Strength | ASTM D638 | Kg cm$^{-2}$ |
| Annealed Heat Distortion Temp.* | ASTM D648-88 | °C. |
| Izod Impact Resistance** | ASTM D250 | N · m/m |
| Spiral Mold Flow | see below | cm. |

*at 264 psi (1.4 MPa) annealed 24 hrs at 50° C.
**at room temperature

Spiral mold flow is a measure of the extent of injection melt flow under a fixed work input and predicts limitations in size and configuration of injection molding dies suitable for a given resin compound. The test employs a graduated 60-inch spiral flow mold with 1/8 inch (3.1 mm) by 3/16 inch (4.76 mm) cross section (approx.) used in conjunction with a Arbug injection molding machine. Conditions are kept standardized within each series of tests. Generally, the mold temperature is set at 55° C. the injection melt pressure is constant at 27,000 psi (1440 PA) with a 6-s injection time, 18-s clamp time, and a 5-s mold open time, giving a total cycle time of 29 s. A screw of 25 mm with L/D=18 was used. Stock temperature at the nozzle was 210° C. For every compound at least four consecutive shots were used for averages of spiral flow length measurement with higher numbers being preferred.

The compositions in the examples were also evaluated for processing stability. A primary commercial measure of the relative thermal stability and processability of vinyl compounds is the "dynamic thermal stability time" (DTS) in minutes. This test is designed to measure the time-torque relationship at selected temperatures using an instrument such as the Brabender Plasticorder. The test value generally reported and used for comparison is the "DTS time." DTS time is usually defined as the time required for the instrument torque to fall to its minimum value, with the polymer compound in the melted state, before beginning to increase, presumably due to instability and usually accompanied by autogenous cross-linking. DTS time is dependent not only on polymer properties, but also on temperature, sample size, stabilizers, lubricants, instrument operating conditions, degree of instrument maintenance, and other conditions which are controlled for accurate comparison between different compounds.

TABLE I

| Example | Δ I.V. | Tensile Strength MPa | Notched Izod N · m/m | Unnotched Izod N · m/m | Anneal HDT °C. | Spiral Flow cm |
|---|---|---|---|---|---|---|
| 1 | 0 | 44.80 | 56 | 400.2 | 77.0 | 76.9 |
| 2 | 0.07 | 47.10 | 103 | 1403.6 | 81.6 | 66.0 |
| 3 | 0.22 | 48.6 | 138 | 1878.6 | 82.2 | 55.8 |
| 4 | 0.46 | 51.62 | 246 | 2038.7 | 83.9 | 42.4 |
| 5 | 0.54 | 49.80 | 233 | 1958.6 | 83.9 | 39.6 |
| 6 | 1.14 | 45.21 | 62 | 283.9 | 84.4 | 30.7 |

By way of inspection of the results of Table I with the exception of spiral flow, there is a clear trend of improved properties in examples 2 to 5 with example 6 evidencing a significant drop-off in properties. Examples 4 and 5 exhibit a preferred balance of high tensile strength, impact resistance and HDT. As outlined above, the approach followed an expectation that spiral flow would be reduced but the severity was less than expected as is seen in successive example blends of successively higher I.V. PVC. It was not expected that the other properties would be substantially increased when the I.V. difference between PVC and CPVC (Δ

I.V.) rose above about 0.2 and reached a maximum at between about 0.35 to about 0.65 units thereafter falling as Δ I.V. was beyond about 1.0 units. It was also not expected that property maximums would occur while spiral flow was maintained at an adequate level between 55 and 35 cm. Table I illustrates that outside of the preferred Δ I.V. range as in Examples 1 and 6 wherein Δ I.V. is 0 and 1.60−0.46=1.14 respectively, performance dropped off dramatically. Therefore, blends of CPVC and PVC having a Δ I.V. ranging from about 0.2 to about 1.0 are preferred in addition to blends wherein the Δ I.V. is between 1.0 and 1.5 provided that the amount of PVC does not exceed 15 weight parts, preferably not more than 10 weight parts on the basis of combined CPVC and PVC.

Demonstration of improved impact toughening of a CPVC/PVC blend versus CPVC alone in combination with a conventional impact modifier is shown by Examples 7-9. The ingredients with a conventional impact modifier is shown by Examples 7-9. The ingredients were hand mixed and fluxed in a Banbury mill at 380° F. to 390° F. and held for 1 minute. The fluxed compound was milled on a 2-roll for 4 minutes after holding at 355° F.-360° F. The milled sheets were cubed. The cubes were injection molded at a stock temperature of 395° F.-400° F. for measurements of physical properties and spiral flow. The compound formula for Examples 7-9 is given below:

|  | Example/Parts | | |
| --- | --- | --- | --- |
|  | 7 | 8 | 9 |
| CPVC (0.46 I.V., 63.5% Chlorine) | 88 | 88 | 88 |
| PVC (0.92 I.V.) | — | — | 10 |
| Titanium dioxide | 4.5 | 4.5 | 4.5 |
| Impact modifier | 10 | 6.0 | 6.0 |
| Tin stabilizer | 2.0 | 2.0 | 2.0 |
| Lubricants | 3.0 | 3.0 | 3.0 |

TABLE II

| Example | Tensile Strength MPa | Notched Izod JM* | Unnotched Izod J | Annealed HDT °C.** | Spiral Flow cm |
| --- | --- | --- | --- | --- | --- |
| 7 | 47.4 | 300 | 1996 | 90.5 | 44 |
| 8 | 50.1 | 338 | 1791 | 89 | 46 |
| 9 | 51.9 | 678 | 2154 | 87.5 | 44.4 |

*of notch
**at 264 psi (1.82 MPa) annealed for 24 hrs. at 72° C.

Example 9 contained 10 parts of PVC and Δ I.V. was 0.48 and within the preferred Δ I.V. range. A 40 percent reduction in the level of impact modifier was used in Examples 8 and 9 compared to Example 7. Example 9 exhibited unexpected improvements in tensile strength and a very large increase in impact resistance, yet with little reduction in spiral flow versus Example 8 absent PVC. Example 9 thus compares favorably with Examples 7 and 8 and will also exhibit significantly improved weathering performance and chemical resistance with reduced levels of impact modifier. The loss in weathering and chemical resistance due to impact modifiers is known.

It is desirable for injection moldable resin compounds generally to exhibit spiral melt flow rates of at least about 25 cm. As outlined above, if a higher I.V. CPVC is employed and the PVC is selected according to the preferred Δ I.V. range, melt flow of the blend may be increased by the use of a minor amount of one or more melt flow enhancers known in the art, for example, a high melt flow polyolefin or polystyrene. The melt flow enhancer can also be a Tg enhancing additive such as an acrylic imide copolymer or styrene derivative polymer. Typical usage levels would be about 0.2 to about 100 parts by weight based on the weight of the blend. Preferred levels of Tg enhancing additive are from 0.2 to 40 weight parts and most preferably from 0.2 to 10 weight parts per 100 weight parts of CPVC/PVC blend. Preferredly, the need for melt flow enhancers is minimized by selecting the desired I.V. ranges for CPVC and PVC so as to give adequate flow as in examples 4 and 5. From the above examples it is shown from Example 9 in a composition comprising a major amount of a CPVC derived from a precursor PVC within the most preferred range of I.V. in combination with a minor amount of PVC having an I.V. within the most preferred range, and an impact modifier, wherein Example 9 exhibits a notched Izod impact strength at least as high as a composition absent said blended PVC and containing at least 40 percent more impact modifier than that used for said first composition.

FURTHER DETAILED DESCRIPTION

Ternary Alloys

The PVC/CPVC/alloying polymer alloys of this invention have higher HDT than would be predictable from properties measured on binary blends of PVC/CPVC and PVC alloying polymer. Furthermore, the melt viscosities of the ternary alloys are less than would be predictable from measured viscosities of the three component polymers. These effects are attributed to interactions between the alloying polymer and the PVC and CPVC. Thus, the unexpected result of these interactions of the alloying polymer in a ternary alloy is that HDT is selectively enhanced or reduced, apparent melt viscosity is selectively enhanced or reduced, or preferably the HDT is selectively enhanced and the melt viscosity is selectively reduced. A further result of these interactions is that a substantial part of the alloying polymer used in a binary PVC alloy can be replaced by CPVC with essentially no change in HDT compared to a binary PVC alloy containing a greater portion of alloying polymer. By replacing part of the alloying polymer with a predetermined amount of CPVC, the disadvantages of blending the alloying polymer with PVC, namely the reduction in flame resistance and increase in embrittlement, are reduced. This is because CPVC is known to have an even better flame resistance than PVC because of its higher chlorine content. Also, CPVC is known to be less ductile than PVC, but more ductile than the alloying polymers described herein which are brittle plastics. The IV of the PVC and the PVC used to make the CPVC need not be different and desirably can be the same.

The poly(vinyl chloride) polymers (PVC) and copolymers as described in the Detail Description are generally suitable for the PVC of this embodiment. The inherent viscosities (IV) of the PVC desirable for this embodiment using standard conditions of ASTM-D1243 can range from 0.20 to about 2.0 I.V. or higher, desirably from 0.30 to about 1.0 or 1.2, and preferably from about 0.40 to about 0.65 or 0.70 I.V. units.

The chlorinated poly(vinyl chloride) polymers (CPVC) described in the Detailed Description are generally suitable for this embodiment.

For this embodiment, the weight percent chlorine for the CPVC is from about 60 to about 78, desirably from about 63 to about 70, and preferably from about 63 to about 68. Techniques for post-chlorination of PVC besides those given in the Detail Description include that of U.S. Pat. No. 4,412,898, which discloses a water slurry chlorination method. The chlorination of PVC resins in a slurry process is known not to occur uniformly to the PVC and possibly not to be uniform along any polymer chain. Thus, the level of chlorination reported are average levels for the material.

The inherent viscosity of the PVC useful to make CPVC for this embodiment is from about 0.2 to about 2.0, desirably from about 0.30 to about 1.0, and preferably from about 0.4 to about 0.65 or 0.70.

The exact chemical nature of the alloying polymers depends on branching, sequence distribution of polar and less polar polymers, and composition in terms of the weight percent of each monomer in the copolymer. The preferred alloying polymers have an average molecular weight above their entanglement molecular weight such that their average molecular weight is from about 20,000 to about 500,000 and desirably from about 30,000 to about 100,000. The alloying polymers can be copolymers described as Tg enhancers and/or flow enhancers in the Detailed Description.

Generally, the alloying polymer can be various polymer or copolymers of the below specified monomers. Specific weight percents of the monomers will perform differently depending on the percent chlorine in the chlorinated PVC.

The copolymers used as alloying polymers can be made by any free radical or ionic polymerization method. These alloying polymers can be random copolymers or block copolymers. These alloying polymers can also be made by imidizing poly(methacrylate) polymers or various anhydride polymers or copolymers such as styrene-maleic anhydride copolymers. Specifically excluded from being alloying polymers in this application are alpha-methylstyreneacrylonitrile copolymers consisting essentially (>98 wt. %) of alpha-methylstyrene and acrylonitrile having from 60 to 90 wt percent α-methylstyrene, and from 10 to 40 wt. % acrylonitrile when the amount of PVC in the ternary alloy is above 30 parts per 100 parts of the ternary alloy. The alloying polymers can be identified by their Tg, their miscibility with either PVC or CPVC and the results of enhanced interaction in binary alloys with CPVC or PVC, or both. As the desirable ternary alloys have high heat distortion temperatures, the alloying polymers desirably have a Tg above 80° C., and preferably above 100° C. As the ternary blends of this invention are alloys, the alloying polymer must form an alloy with either the PVC or CPVC in binary mixtures.

Examples of suitable monomers for forming the alloying copolymers of the present invention are alpha alkylstyrene monomer, vinyl benzene monomer, acrylate or methacrylate monomers, substituted nitrile monomers, acrylamide monomers, and dicarboxylic anhydrides having double bonds such as maleic anhydride.

The alpha substituted styrene monomer is selected from compounds having the formula

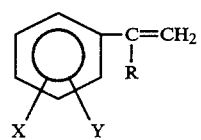

where X and Y can be the same or different and are selected from hydrogen, halogens and alkyl radicals having from 1 to 3 carbon atoms, preferably X and Y are selected from hydrogen, chlorine, and alkyl radicals of 1 to 3 carbon atoms; and R is selected from alkyl radicals having from 1 to 8 carbon atoms, preferably 1 to 4 carbon atoms, or cyano groups. Specific examples of alpha-substituted styrene include alpha-methylstyrene, p-methyl-alphamethylstyrene, 2,4-dimethyl-alpha methylstyrene, 2,5-dimethyl-alpha-methylstyrene, 2,5,6-trimethyl-alphamethylstyrene, p-t-butyl-alpha-methylstyrene, alphaethylstyrene, alpha-propylstyrene, alpha-butylstyrene, alpha hexylstyrene, etc.

The vinyl benzene monomer is selected from compounds having the formula.

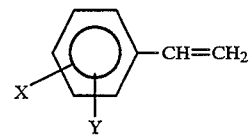

where X and Y can be the same or different and are selected from hydrogen and alkyl radicals having from 1 to 3 carbon atoms, preferably X and Y are selected from hydrogen and alkyl radicals having from 1 to 3 carbon atoms. Specific examples of vinyl benzene monomers include styrene, vinyl toluene, butylstyrene, ethylstyrene, propylstyrenes, etc.

The (meth)acrylate monomer is selected from compounds having the formula

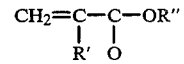

where R' is selected from hydrogen and alkyl radicals having 1 to 4 carbon atoms, more preferably R' is methyl; and R" is selected from hydrogen, alkyl radicals of 1 to 4 carbon atoms, preferably alkyl radicals have from 1 to 2 carbon atoms, and more preferably R" is methyl. Specific examples of such monomers include methyl methacrylate, ethyl methacrylate, propyl methacrylate, butyl methacrylate, methyl acrylate, ethyl acrylate, propyl acrylate, or butyl acrylate. The amount of alkyl acrylates wherein R' is hydrogen and is limited to from 0 to 10 mole percent of the monomers in the polymer so that the Tg of the alloying polymer doesn't drop below 80° C.

The substituted nitrile monomer is selected from compounds having the formula

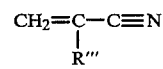

where R''' is selected from hydrogen and alkyl radicals having 1 to 8 carbon atoms, preferably R''' is selected from hydrogen or alkyl radicals having 1 to 4 carbon atoms. Specific examples of suitable nitriles include acrylonitrile, methacrylonitrile, ethacrylonitrile, etc.

Also included as monomers are the acrylamides and substituted acrylamides having from 5 to 11 carbon atoms such as N,N'-dimethacrylamide and N,N'-dibutylacrylamide. Also included as monomers are free radically polymerizable dicarboxylic anhydrides having from 4 to 8 carbon atoms such as maleic anhydride.

An example of a specific desirable alloying terpolymer is alpha-methylstyrene, acrylonitrile, and methyl methacrylate made by free radical polymerization. The range of weight percent of the total compositional weight for alpha-methylstyrene is desirably from about 40 to about 85, and more desirably about 50 to about 70. The weight percent acrylonitrile is desirably from about 5 to about 19 and more desirably from about 10 to about 17. The weight percent methyl methacrylate is desirably from about 10 to about 40 and more desirably from about 14 to about 35.

Another specific alloying polymer can be a terpolymer of alpha-methylstyrene, acrylonitrile, and styrene. The weight percent of alpha-methyl styrene can desirably be from about 60 to about 88 and more desirably from about 65 to about 85. The weight percent of acrylonitrile can be desirably from about 10 to about 35 and more desirably from about 15 to about 30. The weight percent styrene can desirably be from about 2 to about 10 and more desirably from about 3 to about 7. Terpolymers of some of these compositions are available commercially as Blendex ® from General Electric Corporation. A preferred alloying polymer is Blendex ® 586.

Other specific alloying polymers are styreneacrylonitrile (SAN) copolymer desirably containing 10 to 32, preferably 15 to 27 wt. % acrylonitrile, and styrene-maleic anhydride copolymers desirably containing 5–25 wt. % maleic anhydride, with or without imidization.

Also included in alloying polymers are methacrylate polymers or copolymers or styrene-maleic anhydride copolymers. These polymers preferably imidized after polymerization with amines having from 1 to 8 carbon atoms and preferably 1 to 5 carbon atoms. The imide can desirably be from about 10 to about 60, more desirably from about 20 to about 50, and preferably from about 30 to about 50 wt. % of the polymer. One such imidized polymer of poly(methyl methacrylate) is available from Rohm and Haas as Paraloid ® HT510.

The amount of PVC in the mixture of PVC/CPVC/alloying polymer is desirably from about 5 to about 50 parts, more desirably from about 10 to about 40 parts, and preferably from about 10 to about 35 parts by weight per 100 parts by weight of PVC, CPVC, and alloying polymers.

The amount of CPVC in the mixture of PVC/CPVC/alloying polymer is desirably from about 10 to about 85 parts, more desirably from about 20 to about 80 parts, and preferably about 30 to about 60 parts by weight per 100 parts by weight of PVC, CPVC, and alloying polymers.

The amounts of alloying polymers in the mixture of PVC/CPVC/alloying polymer is desirably from about 10 to about 85 parts, more desirably from about 10 to about 60 parts, and preferably from about 10 to about 50 parts by weight per 100 parts by weight PVC, CPVC, and alloying polymers.

The predicted heat distortion temperature (HDT) for a ternary alloy at a fixed weight percent of PVC is calculated from the experimentally observed HDT values for a PVC/CPVC binary blend and PVC/(AP=alloying polymer) binary alloys having the same fixed weight percent of PVC. As the data in Table III show, neither the PVC/CPVC binary blend or PVC/AP binary alloy shows additivity in HDT with weight percent composition. Thus, there is no reason to assume that a ternary alloy of these components would have enhanced HDT values. Whatever the reasons for this HDT behavior, it is assumed that the effects are carried over into the ternary alloys when calculating expected HDT values. Thus, $\text{HDT}_{aPVC,(100-a)CPVC}$ is the HDT of the PVC/CPVC binary blend at a PVC weight percent (a), and $\text{HDT}_{aPVC,(100-a)AP}$ is the HDT of the PVC/AP binary alloy at the same PVC weight percent (a). Each binary composition is treated mathematically as a polymer composition of a specific HDT value. For ternary compositions, different proportions of the binary blends and alloys can be used. If X is the weight fraction of PVC/CPVC binary blend in the ternary mixture, and (1-X) is the weight fraction of PVC/AP binary alloy in the ternary mixture, then the predicted HDT of the ternary alloy can be calculated according to the linear additivity equation:

$$\text{HDT} = (X)\text{HDT}_{aPVC,(100-a)CPVC} + (1-X)\text{HDT}_{aPVC,(100-a)Ap}$$

The predicted apparent melt viscosity (viscosity at non-zero shear conditions) for ternary alloys can be estimated using a generalized blending law. The apparent melt viscosity is calculated via the following equation:

$$(\eta_{alloy})^a = \phi_1(\eta_1)^a + \phi_2(\eta_2)^a + \phi_3(\eta_3)^a$$

where
$\phi_1$ = volume fraction of component 1
$\phi_2$ = volume fraction of component 2
$\phi_3$ = volume fraction of component 3
and,
$\eta_1$ = apparent viscosity of component 1 at a given temperature
$\eta_2$ = apparent viscosity of component 2 at a given temperature
$\eta_2$ = apparent viscosity of component 3 at a given temperature
and,
a = 1/3.4 which reflects the molecular weight dependence of the zero-shear viscosity given that $$\eta_o = \text{constant } (Mw)^{3.4}$$

The word "alloy" is used to mean a mixture where the components are intermixed to the stage that the physical properties of at least one of the one or more phases present is no longer that of a single pure component, but rather it is intermediate in physical properties of two or more components. The choice of the physical properties used as the testing criteria can often decide whether a blend is also considered an alloy. Some physical tests require mixing be on a smaller or larger scale to affect results. It is also understood that an alloy, as in metal alloys, need not be one homogeneous phase.

The invention will be better understood by reference to the following examples.

EXAMPLES

The following tables show the predicted and experimentally determined heat distortion temperatures and melt viscosities on various blends of PVC, CPVC, and alloying polymers. The experimentally determined heat distortion temperatures were determined by method ASTM D648-88. Unless otherwise specified, the chlorine content of the CPVC is approximately 66 percent by weight.

The following Table III shows the heat distortion temperature (HDT) vs composition relationships for three binary pairs of PVC, CPVC, and Blendex ® 586 that makeup one of the ternary alloy compositions of this invention. The difference values reveal whether the HDT vs composition values of a pair show linearity (no difference), enhanced HDT (observed HDT greater than predicted), or reduced HDT (observed HDT less than predicted). The PVC/CPVC is an immiscible binary blend because it exhibits two separate phases of its constituent parts as determined by thermal analysis and/or transmission electron microscopy. The other two pairs are alloys because the constituent parts are dissolved in each other to the extent that the mixture exhibits a single glass transition temperature (one phase) or the alloys consist of two glass transition temperatures (two phases) because the two polymers are partially dissolved in each other to the extent that one or both of the Tg values are different than those of the pure components.

The ternary alloys (shown in Table IV) show two glass transition temperature (two phases). The lower Tg phase is the PVC rich phase and has a Tg value greater than that of the PVC alone. The higher Tg phase is the CPVC rich phase and has a higher Tg value than that of the CPVC alone reflecting the unexpected enhanced interaction of the alloying polymer and CPVC in the CPVC rich phase.

TABLE III

| Wt. Percent CPVC | Observed HDT (°C.) | Predicted[b] HDT (°C.) | Difference (°C.) | $T_{g_1}$ (°C.) | $T_{g_2}$ (°C.) |
|---|---|---|---|---|---|
| PVC/CPVC BINARY ALLOY | | | | | |
| 0 | 72.0 | 72.0 | 0 | 84 | — |
| 20 | 73.5 | 77.9 | −4.4 | 85 | — |
| 50 | 77.0 | 87.1 | −10.1 | 87.5 | 116 |
| 60 | 82.0 | 90.0 | −8.0 | 90 | 125 |
| 70 | 85.0 | 93.1 | −8.1 | 89 | 121 |
| 80 | 92.5 | 96.2 | −3.7 | 90.5 | 119.5 |
| 100 | 102.5 | 102.5 | 0 | 118 | — |

| Wt. % Blendex 200 586 | Observed HDT (°C.) | Predicted[b] HDT (°C.) | Difference (°C.) | $T_{g_1}$ (°C.) | $T_{g_2}$ (°C.) |
|---|---|---|---|---|---|
| PVC/BLENDEX ® 586[a] BINARY ALLOY | | | | | |
| 0 | 72.0 | 72.0 | 0 | 84 | — |
| 20 | 77.5 | 80.0 | −2.5 | 91 | — |
| 40 | 84.5 | 87.5 | −3.0 | 100 | — |
| 50 | 89.5 | 91.5 | −2.0 | 102 | — |
| 70 | 96.0 | 99.1 | −3.1 | 113 | — |
| 80 | 101.0 | 103.0 | −2.0 | 116 | — |
| 100 | 111.0 | 111.0 | 0 | 127 | — |
| CPVC/BLENDEX ® 586 BINARY ALLOY | | | | | |
| 0 | 102.5 | 102.5 | 0 | 118 | — |
| 20 | 105.0 | 103.9 | +1.1 | 117 | 131 |
| 50 | 109.0 | 106.7 | +2.3 | 122 | — |
| 100 | 111.0 | 111.0 | 0 | — | 127 |

[a]Blendex ® 586 is a alpha-methylstyrene-acrylonitrile-styrene terpolymer available from General Electric.
[b]calculated assuming linear additivity.

The following Table IV shows the benefit of CPVC/Blendex ® 586 enhanced interaction in ternary PVC/CPVC Blendex ® 586 alloys where the PVC concentration is kept constant. The benefit of this enhanced interaction is to require less alloying agent (Blendex ® 586) to achieve a desired HDT value than would be required if no enhanced interaction existed. The column entitled "Weight % Blendex ® 586 needed if no CPVC" in Table IV below shows that CPVC can be used in this mixture to reduce the amount of Blendex ® 586 required.

TABLE IV

| Weight Percent Blendex ® 586 | Weight Percent CPVC | Observed HDT (°C.) | Predicted[b] HDT (°C.) | Difference (°C.) | Weight Percent Blendex ® 586 needed[c] if no CPVC | $T_{g_1}$ (°C.) | $T_{g_2}$ (°C.) |
|---|---|---|---|---|---|---|---|
| PVC(20)/CPVC/BLENDEX ® 586 TERNARY ALLOY PVC CONCENTRATION CONSTANT AT 20 WEIGHT PERCENT | | | | | | | |
| 0 | 80 | 92.3 | 92.3 | 0 | — | 91 | 120 |
| 30 | 50 | 97.0 | 95.6 | +1.4 | 71 | 107 | 124 |
| 50 | 30 | 98.5 | 98.5 | +0.8 | 74 | 110 | 124 |
| 80 | 0 | 101.0 | 101.0 | 0 | — | 116 | — |
| PVC(20)/CPVC/BLENDEX ® 586 TERNARY ALLOY PVC CONCENTRATION CONSTANT AT 30 WEIGHT PERCENT | | | | | | | |
| 0 | 70 | 85.0 | 85.0 | 0 | — | 89 | 121 |
| 20 | 50 | 90.0 | 88.3 | +1.7 | 54 | 100 | 122 |
| 30 | 40 | 93.0 | 89.9 | +3.1 | 61 | 102 | 124 |
| 40 | 30 | 94.0 | 91.5 | +2.5 | 67 | 106 | 123 |
| 50 | 20 | 95.5 | 93.1 | +2.4 | — | 108 | 128 |
| 70 | 0 | 96.5 | 96.5 | 0 | — | 113 | — |

[b]calculated assuming linear additivity.
[c]interpolated from observed HDT of PVC/Blendex ® 586 data in Table V.

The following Table V shows the heat distortion temperature (HDT) vs composition relationships for a ternary alloy exhibiting unexpected enhanced HDT based on a α-methylstyrene/acrylonitrile/MMA terpolymer. In this example the PVC/alloying polymer binary system shows HDT values less than predictable from linear additivity. The CPVC/alloying polymer binary system shows an unexpected greater enhancement of HDT compared to what is predictable, which is another example of the basic requirement of this invention. The values of the "difference" column reveals whether the HDT vs composition values of a system show linearity (no difference), enhanced HDT (observed HDT greater than predictable), or reduced HDT (observed HDT less than predictable). The PVC/CPVC pair (shown in Table III) is an immiscible blend because it exhibits two separate phases of its constituent parts. The other two pairs are alloys because the constituent parts are dissolved in each other to the extent that the mixture exhibits a single glass transition temperature (one phase). The ternary alloys (shown in Table V) with 15 and 30 wt. % terpolymer have HDT values equivalent to binary alloys of PVC having 50 and 56 wt. % of the terpolymer. The ternary alloys show two Tg's (two phases). The lower Tg phase is a PVC rich phase having a Tg value greater than that of the PVC alone. The higher Tg phase is the CPVC rich phase and has a Tg value essentially the same as that of the CPVC alone.

TABLE V

| Weight Percent Terpolymer | Observed HDT (°C.) | Predicted[b] HDT (°C.) | Difference (°C.) | $T_{g1}$ (°C.) | $T_{g2}$ (°C.) |
|---|---|---|---|---|---|
| PVC/(AMS/AN/MMA 55/15/30) BINARY ALLOY | | | | | |
| 0 | 71.5 | 71.5 | 0 | 84 | — |
| 50 | 91.5 | 95.0 | −3.5 | 105 | — |
| 70 | 101.0 | 104.3 | −3.3 | 116 | — |
| 100 | 118.5 | 118.5 | 0 | 136 | — |
| CPVC/(AMS/AN/MMA 55/15/30) BINARY ALLOY | | | | | |
| 0 | 104.0 | 104.0 | 0 | 118 | — |
| 20 | 108.5 | 107.0 | +1.5 | 119 | — |
| 50 | 115.0 | 111.4 | +3.6 | 129 | — |
| 100 | 118.5 | 118.5 | 0 | 136 | — |

| Weight Percent Terpolymer | Weight Percent CPVC | Observed HDT (°C.) | Predicted[b] HDT (°C.) | Difference (°C.) | Weight Percent Terpolymer needed[c] if no CPVC | $T_{g1}$ (°C.) | $T_{g2}$ (°C.) |
|---|---|---|---|---|---|---|---|
| PVC(30)/CPVC/(AMS/AN/MMA 55/15/30) TERNARY ALLOY PVC CONCENTRATION CONSTANT AT 30 WEIGHT PERCENT | | | | | | | |
| 0 | 70 | 87.0 | 87.0 | 0 | — | 88 | 120 |
| 15 | 55 | 91.5 | 90.1 | +1.4 | 50 | 94 | 120 |
| 30 | 40 | 94.0 | 93.1 | +0.9 | 56 | 101 | 119 |
| 70 | 0 | 101.0 | 101.0 | 0 | — | 116 | — |

[b]calculated assuming linear additivity.
[c]interpolated from PVC/(AMS/AN/MMA)data.

The following Table VI shows the heat distortion temperature (HDT) vs composition relationships for alloys of PVC, CPVC, and an alloying polymer composed of alphamethylstyrene, acrylonitrile, and methyl methacrylate that show reduced HDT values. The binary alloys plus the PVC/CPVC binary blend (shown in Table III) which is immiscible and also shows reduced HDT values compared to what is predictable, comprise a ternary alloy in which reduced HDT values also occur. This is in contrast to the basis of our invention, which requires enhanced HDT in the CPVC/alloying polymer binary system in order to achieve enhanced HDT in the ternary alloy. The values of the "difference" reveals whether the HDT vs composition values of a system show linearity (no difference), enhanced HDT (observed HDT greater than predictable), or reduced HDT (observed HDT less than predictable). In this example where the potential alloying polymer did not show enhanced HDT in the CPVC/alloying polymer binary blends, it also did not show enhanced HDT in a ternary alloy. In such a ternary system, it is not possible to substitute some of the alloying polymer with CPVC without substantial loss of HDT.

TABLE VI

| Weight Percent Terpolymer | Observed HDT (°C.) | Predicted[b] HDT (°C.) | Difference (°C.) | $T_{g1}$ (°C.) | $T_{g2}$ (°C.) |
|---|---|---|---|---|---|
| PVC/(AMS/AN/MMA 50.5/19.5/30) BINARY ALLOY | | | | | |
| 0 | 71.5 | 71.5 | 0 | 84 | — |
| 50 | 85.0 | 88.7 | −3.7 | 102 | — |
| 70 | 93.5 | 95.9 | −2.4 | 106 | — |
| 100 | 106.0 | 106.0 | 0 | 125 | — |
| CPVC/(AMS/AN/MMA 50.5/19.5/30) BINARY ALLOY | | | | | |
| 0 | 104.0 | 104.0 | 0 | 110 | 127 |
| 50 | 99.0 | 104.4 | −5.4 | 112 | 145 |
| 70 | 101.5 | 105.0 | −3.5 | 125 | 148 |
| 100 | 106.0 | 106.0 | 0 | 125 | — |

| Weight Percent Terpolymer | Weight Percent CPVC | Observed HDT (°C.) | Predicted[b] HDT (°C.) | Difference (°C.) | $T_{g1}$ (°C.) | $T_{g2}$ (°C.) |
|---|---|---|---|---|---|---|
| PVC(30)/CPVC/(AMS/AN/MMA 50.5/19.5/30) TERNARY ALLOY | | | | | | |

TABLE VI-continued

| PVC CONCENTRATION CONSTANT AT 30 WEIGHT PERCENT | | | | | | |
|---|---|---|---|---|---|---|
| 0 | 70 | 85.0 | 85.0 | 0 | 89 | 121 |
| 15 | 55 | 85.0 | 88.7 | −3.7 | 92 | 116 |
| 30 | 40 | 87.0 | 90.0 | −3.0 | 102 | — |
| 70 | 0 | 93.5 | 95.9 | −2.4 | 106 | — |

[b]calculated assuming linear additivity

The following Table VII contains heat distortion temperature (HDT) vs composition data for a PVC/alloying polymer binary system which shows essentially linearity and a CPVC/alloying polymer binary system which shows HDT values greater than would be predictable with such a binary system, based on the combined HDT's and proportions of the two polymers. The ternary alloy of PVC, CPVC, and imidized methyl methacrylate polymer known as HT510 made by reacting poly(methyl methacrylate) with dimethylamine also shows enhanced HDT over that which would be predictable. The difference values indicate whether the HDT versus composition values of a system show linearity (no difference), enhanced HDT (observed greater than predictable), or reduced HDT (observed less than predictable). This alloying polymer which showed enhanced values in the HDT for the CPVC/alloying polymer binary alloys also showed greater HDT for the ternary alloy than predictable.

by thermal analysis two separate phases of its constituent parts as does the PVC/SAN blend. The other binary pair, CPVC/SAN is reported (U.S. Pat. No. 4,647,626) to be an alloy, and in this present work we found only single Tgs, though the Tgs are sufficiently close in the formulations (CPVC=109° C. SAN=105° C.) so as to possibly preclude separate identification by the thermal analysis technique. The PVC is a PVC with an I.V. of 0.68, Mw=107,000, and Mn=25,000 and the CPVC is a chlorinated version of (63.5%Ci, density 1.512). The recipes are the same as with the other ternary systems. In addition to the binary or ternary components they contain 2 phr Thermolite® 31, a tin-sulfur stabilizer, 1.5 phr K120N, a Rohm & Haas methacrylate processing aid, and 0.25 phr, AC629A, an Allied Chemical oxidized polyethylene lubricant.

The PVC/CPVC binary blend exhibited reduced values in HDT and showed 2 Tgs essentially the same as those of the constituent polymers by DSC over the

TABLE VII

| Weight Percent HT510 | Observed HDT (°C.) | Predicted[b] HDT (°C.) | Difference (°C.) | $T_{g1}$ (°C.) | $T_{g2}$ (°C.) |
|---|---|---|---|---|---|
| PVC/HT510 BINARY ALLOY | | | | | |
| 0 | 71.5 | 71.5 | 0 | 84 | — |
| 20 | 81.5 | 80.7 | +0.8 | 96 | — |
| 50 | 95.0 | 94.2 | +0.8 | 110 | — |
| 70 | 102.5 | 102.9 | −0.4 | 120 | — |
| 80 | 107.0 | 107.0 | 0 | 124 | — |
| 100 | 116.5 | 116.5 | 0 | 133 | — |
| CPVC/HT510 BINARY ALLOY | | | | | |
| 0 | 103.5 | 103.5 | 0 | 113 | — |
| 20 | 109.0 | 106.0 | +3.3 | 125 | — |
| 50 | 115.5 | 110.0 | +5.5 | 132 | — |
| 100 | 116.5 | 116.5 | 0 | 132 | — |

| Weight Percent HT510 | Observed HDT (°C.) | Predicted[b] HDT (°C.) | Difference (°C.) | Weight Percent HT510 if no CPVC | $T_{g1}$ (°C.) | $T_{g2}$ (°C.) |
|---|---|---|---|---|---|---|
| PVC(30)/CPVC/HT510 TERNARY ALLOY PVC CONCENTRATION CONSTANT AT 30 WEIGHT PERCENT | | | | | | |
| 0 | 85.0 | 85.0 | 0 | — | 89 | 121 |
| 10 | 90.5 | 89.8 | +0.7 | 41 | 95 | 122 |
| 20 | 93.0 | 91.9 | +1.1 | 46 | 101 | 125 |
| 50 | 100.5 | 98.1 | +2.4 | 64 | 134 | — |
| 60 | 103.5 | 100.4 | +3.1 | 71 | 117 | — |
| 70 | 102.5 | 102.5 | 0 | — | 120 | — |

[b]predicted from linearity

The following Table VIII show various heat distortion temperature (HDT) vs composition relationships for three binary pairs that makeup one of the ternary alloy compositions of this invention. The difference values point out whether the HDT vs composition values show linearity (no difference), enhanced HDT (observed HDT greater than predictable), or reduced HDT (observed HDT less than predictable). The PVC/CPVC is an immiscible blend because it exhibits entire composition range. The PVC/SAN(18%AN) binary blend exhibited reduced values in HDT and showed 2 Tgs of its constituent parts over the entire composition range. The CPVC(63.5%Cl)/SAN(18-%AN) binary alloy showed enhanced values in HDT over the entire composition range. The enhanced HDT values seen in the CPVC/SAN binary alloy is conferred on the PVC/CPVC/SAN ternary alloy with PVC at 30 wt. %.

TABLE VIII

| Weight Percent CPVC | Observed HDT (°C.) | Predicted[b] HDT (°C.) | Difference (°C.) | $T_{g1}$ (°C.) | $T_{g2}$ (°C.) |
|---|---|---|---|---|---|
| PVC/CPVC (63.5% Cl) BINARY BLEND | | | | | |

TABLE VIII-continued

| | | | | | |
|---|---|---|---|---|---|
| 0 | 71.5 | 71.5 | 0 | 86 | — |
| 30 | 85.5 | 78.2 | −2.7 | 88 | — |
| 50 | 80.5 | 82.6 | −2.1 | 90 | 110 |
| 70 | 80.5 | 86.9 | −1.4 | 94 | 109 |
| 80 | 88.5 | 89.0 | −0.5 | 94 | 108 |
| 100 | 93.5 | 93.5 | 0 | 109 | — |

| Weight Percent SAN | Observed HDT (°C.) | Predicted[b] HDT (°C.) | Difference (°C.) | $T_{g1}$ (°C.) | $T_{g2}$ (°C.) |
|---|---|---|---|---|---|
| PVC/SAN (18% AN) BINARY BLEND | | | | | |
| 0 | 71.5 | 71.5 | 0 | 86 | — |
| 30 | 76.0 | 76.9 | −0.9 | 85 | 100 |
| 50 | 80.0 | 80.4 | −0.4 | 84 | 100 |
| 70 | 82.5 | 84.1 | −1.6 | 84 | 101 |
| 100 | 89.5 | 89.5 | 0 | 105 | — |

[b]Predicted from linear additivity.

| Weight Percent SAN | Observed HDT (°C.) | Predicted[b] HDT (°C.) | Difference (°C.) | $T_{g1}$ (°C.) | $T_{g2}$ (°C.) |
|---|---|---|---|---|---|
| CPVC (63.5% Cl)/SAN (18% AN) BINARY ALLOY | | | | | |
| 0 | 93.5 | 93.5 | 0 | 109 | — |
| 30 | 93.5 | 91.4 | +2.1 | 107 | — |
| 50 | 93.0 | 90.6 | +2.4 | 108 | — |
| 70 | 92.0 | 89.9 | +2.1 | 108 | — |
| 100 | 89.5 | 89.5 | 0 | 105 | — |
| PVC/CPVC (63.5% Cl)/SAN (18% AN) TERNARY ALLOY PVC CONCENTRATION CONSTANT AT 30 WEIGHT PERCENT | | | | | |
| 0 | 85.0 | 85.0 | 0 | 94 | 109 |
| 15 | 84.0 | 84.4 | +0.4 | 91 | 107 |
| 35 | 85.5 | 83.6 | +1.9 | 88 | 104 |
| 55 | 84.5 | 82.8 | +1.7 | 85 | 100 |
| 70 | 82.5 | 82.5 | 0 | 84 | 101 |

[b]calculated assuming linear additivity

Table IX shows the three binary blends of PVC, CPVC and Blendex ® 586, an alpha methylstyrene-acrylonitrile-styrene copolymer of various compositions, and their apparent experimental and predicted apparent melt viscosities. We can only speculate as to the reason for this viscosity behavior. It is clear, however, that while the special nature of the interactions among the three polymers, PVC, CPVC, and alloying polymer, can effect in the melt state a lesser viscosity than predicted, in the glassy state it can effect a greater HDT than predicted. The lesser viscosity along with higher HDT results in a more easily processed composition with better properties in terms of higher temperature uses. The apparent melt viscosities were determined using a Shimadzu Flow Tester (Shimadzu Corporation) capillary rheometer fitted with a 2:1 (L/D) die to attain shear rates between 100–1000 s$^{-1}$.

Samples were prepared by powder mixing of components in a Waring Blender. Powders were milled at 190° C. with roller speeds of 30 rpm (front) and 20 rpm (back). Milled stock was chipped into small pieces for loading into the capillary rheometer. Temperature sweeps were performed from 140° C. to final temperatures ranging from 185°–250° C., depending upon the sample. Apparent viscosity as a function of temperature was calculated from the stroke versus time curves.

The data show that CPVC/586 blends have high viscosity while the blend of PVC with either CPVC or 586 has lower viscosity.

TABLE XI

Predicted versus Experimental Apparent Melt Viscosity Obtained at 191° C. for Binary Alloys of PVC/CPVC/Blendex ® 586

| | Composition by Weight | $\eta_{app}$ P Experimental | $\eta_{app}$ P Predicted |
|---|---|---|---|
| CPVC/586 | 80/20 | 339,000 | 436,000 |
| | 50/50 | 250,000 | 325,000 |
| | 30/70 | 252,000 | 273,000 |
| PVC/586 | 20/80 | 87,900 | 159,000 |
| | 0/70 | 77,800 | 133,000 |
| | 50/50 | 34,700 | 89,000 |
| | 80/20 | 29,500 | 39,100 |
| PVC/CPVC | 80/20 | 26,200 | 45,300 |
| | 50/50 | 51,300 | 136,000 |
| | 30/70 | 115,000 | 249,000 |

Table X shows the predicted versus experimental values for the apparent melt viscosities for ternary alloys of PVC/CPVC/Blendex ® 586. The homopolymer apparent viscosity values used in calculating the predicted viscosities are as follows: PVC=17,800 P; CPVC=544,000 P and Blendex ®586=215,000 P. The ternary alloys consistently show lower experimental viscosities than that predictable. The viscosity of ternary alloys having 50 wt. % PVC can be compared to PVC/CPVC blends with 50 wt. % PVC/CPVC which have higher viscosities. Similarly, the ternary alloys having 30 wt. % PVC can be compared with a PVC/CPVC binary blend having 30 wt. % PVC. As seen in Table III, a 30 wt. % PVC in a PVC/CPVC blend has a heat distortion temperature of only 85° C. and a viscosity in Table IX of 115,000 P. Ternary alloys of 30 wt. % PVC in Table IV have higher heat distortions of 90° to 95.5° C. and lower viscosities in Table X of 71,000 to 97,500 P. Blends of PVC/Blendex 586 would have higher raw material costs. Blends high in Blendex 586 also do not offer the flame retardancy properties useful in high PVC or CPVC blends. Specific ratios of CPVC to Blendex 586 offer further advantages in lower apparent melt viscosity. For example, a 30/50/20 ternary alloy offers lower apparent melt viscosity than a 30/40/30 ternary alloy even though the 30/50/20 blend has a higher predictable apparent melt viscosity.

Since increased HDT or Tg of a polymer system usually results in higher melt viscosity at a fixed temperature, the use of the ternary alloy idea allows one to achieve higher HDT without the expected concomitant increase in melt viscosity.

TABLE X

Predicted Versus Experimental Apparent Melt Viscosity Obtained at 191° C. for Ternary Alloys of PVC/CPVC/Blendex ® 586

| Composition by Weight | | $\eta_{app}$ P Experimental | $\eta_{app}$ P Predicted |
|---|---|---|---|
| Constant PVC | 20/30/50 | 113,000 | 202,000 |
| | 20/50/30 | 127,000 | 242,000 |
| | 30/20/50 | 71,000 | 156,000 |
| | 30/40/30 | 97,500 | 186,000 |
| | 30/50/20 | 88,800 | 204,000 |
| | 40/30/30 | 66,900 | 140,000 |
| | 50/20/30 | 44,500 | 104,000 |
| | 50/20/30 | 49,000 | 113,000 |
| Constant CPVC | 30/20/50 | 71,000 | 156,000 |
| | 50/20/30 | 44,500 | 104,000 |
| | 20/30/50 | 113,000 | 202,000 |
| | 40/30/30 | 66,900 | 140,000 |
| | 50/30/20 | 49,000 | 113,000 |
| | 30/40/30 | 97,500 | 186,000 |
| | 20/50/30 | 127,000 | 242,000 |
| | 30/50/20 | 88,800 | 204,000 |
| Constant Blendex ® 586 | 30/50/20 | 88,800 | 204,000 |
| | 50/30/20 | 49,000 | 113,000 |
| | 20/50/30 | 127,000 | 242,000 |
| | 30/40/30 | 97,500 | 186,000 |
| | 40/30/30 | 66,900 | 140,000 |
| | 50/20/30 | 44,500 | 104,000 |
| | 20/50/30 | 113,000 | 202,000 |
| | 30/20/50 | 71,000 | 156,000 |

Table XI shows the predicted versus experimental values for the apparent melt viscosities for the three binary mixtures of PVC/CPVC/HT510. The CPVC/HT510 binary alloy shows higher apparent melt viscosities than predictable. On the other hand, the PVC/HT510 and PVC/CPVC binary systems both show lower apparent viscosities than predictable. The latter pair is immiscible and exhibits two phase as indicated by two distinct glass transition temperatures (shown in Table III). The other binary alloys with HT510 are evidently one phase systems because they exhibit one glass transition temperature by thermal analysis (shown in Table VII). However, the interaction between the CPVC and HT510 is evidently stronger than the PVC and HT510 because the enhanced values in HDT (Table VII) are significantly greater in the CPVC binary alloy.

TABLE XI

Predicted Versus Experimental Apparent Melt Viscosity Obtained at 191° C. for Binary Alloys of PVC/CPVC/HT510

| Composition by Weight | | $\eta_{app}$ P Experimental | $\eta_{app}$ P Predicted |
|---|---|---|---|
| CPVC/HT510 | 80/20 | 706,000 | 594,000 |
| | 60/40 | 996,000 | 645,000 |
| | 50/50 | 1,200,000 | 674,000 |
| | 30/70 | 1,380,000 | 740,000 |

TABLE XI-continued

Predicted Versus Experimental Apparent Melt Viscosity Obtained at 191° C. for Binary Alloys of PVC/CPVC/HT510

| Composition by Weight | | $\eta_{app}$ P Experimental | $\eta_{app}$ P Predicted |
|---|---|---|---|
| PVC/HT510 | 20/80 | 349,000 | 492,000 |
| | 50/50 | 60,800 | 186,000 |
| | 60/40 | 56,900 | 128,000 |
| | 80/20 | 39,400 | 54,600 |
| PVC/CPVC | 20/80 | 253,000 | 362,000 |
| | 30/70 | 140,000 | 317,000 |
| | 40/60 | 175,000 | 220,000 |
| | 50/50 | 119,000 | 165,000 |
| | 60/40 | 92,200 | 120,000 |

Table XII shows the predicted versus experimental values for the apparent melt viscosities for ternary alloys of PVC/CPVC/HT510. The homopolymer apparent viscosity values used in calculating the predicted apparent viscosities are as follows: PVC=19,000 P; CPVC=550,000 P and HT510=863,000 P. The interaction between CPVC/HT510 seen in Table XI seems to dominate the data with 20 weight percent or more HT510, causing the experimentally determined apparent melt viscosities to be higher than predicted. These strong interactions between CPVC/HT510 in Table VII were given credit for the greater than predictable increase in heat distortion temperature.

TABLE XII

Predicted versus Experimental Apparent Melt Viscosity Obtained at 191° C. for Ternary alloys of PVC/CPVC/HT510

| Composition by Weight | | $\eta_{app}$ P Experimental | $\eta_{app}$ P Predicted |
|---|---|---|---|
| Constant PVC | 20/30/50 | 477,000 | 433,000 |
| | 20/60/20 | 391,000 | 387,000 |
| | 30/10/60 | 411,000 | 349,000 |
| | 30/20/50 | 385,000 | 336,000 |
| | 30/50/20 | 306,000 | 303,000 |
| | 35/20/45 | 332,000 | 289,000 |
| | 35/35/30 | 294,000 | 275,000 |
| | 50/30/20 | 180,000 | 173,000 |
| Constant CPVC | 30/20/50 | 385,000 | 336,000 |
| | 35/20/45 | 332,000 | 289,000 |
| | 20/30/50 | 477,000 | 433,000 |
| | 30/50/20 | 306,000 | 303,000 |
| | 30/60/10 | 280,000 | 295,000 |
| | 20/60/20 | 391,000 | 387,000 |
| Constant HT510 | 50/40/10 | 160,000 | 169,000 |
| | 30/60/10 | 280,000 | 295,000 |
| | 50/30/20 | 180,000 | 173,000 |
| | 20/60/20 | 391,000 | 387,000 |
| | 35/35/30 | 294,000 | 275,000 |
| | 20/50/30 | 420,000 | 401,000 |
| | 20/30/50 | 477,000 | 433,000 |

Table XIII shows the predicted versus experimental apparent melt viscosities for the three binary blends of PVC/CPVC (63.5% Cl)/SAN (18% AN). This SAN polymer has a number average molecular weight of 23,900 and a weight average of 71,900. The CPVC used in these alloys was made from a PVC having an IV of 0.68 and subsequently post-chlorinated to 63.5%. Although the chlorine content of this CPVC is lower than that of the CPVC used in the previous examples (63.5% versus 66.0%), the apparent viscosity of this CPVC resin is higher than that of the CPVC used in the previous example. This is a result of the IV of the base PVC (0.68 versus 0.55) used to make the CPVC.

TABLE XIII

Predicted Versus Experimental Melt Viscosity Obtained at 191° C. for Binary Alloys of PVC, CPVC (63.5% Cl)/SAN (18% AN)

| Composition by Weight | | $\eta_{app}$ P Experimental | $\eta_{app}$ P Predicted |
|---|---|---|---|
| CPVC/SAN | 70/30 | 186,000 | 246,000 |
| | 50/50 | 45,800 | 86,200 |
| | 30/70 | 9,560 | 26,500 |
| PVC/SAN | 30/70 | 5,700 | 8,370 |
| | 50/50 | 10,800 | 20,500 |
| | 70/30 | 29,600 | 46,000 |
| PVC/CPVC | 20/80 | 506,000 | 675,000 |
| | 30/70 | 394,000 | 561,000 |
| | 50/50 | 260,000 | 389,000 |
| | 70/30 | 248,000 | 259,000 |

Table XIV shows the predicted versus experimental apparent melt viscosities for ternary alloys of PVC/CPVC (63.5% Cl)/SAN (18 wt. % AN). The homopolymer apparent viscosity values used in calculating the predicted apparent viscosities are as follows: PVC=132,000 P; CPVC=937,000 P and SAN=1,340 P. These alloys show lower experimental viscosities than predictable. Thus, both enhanced values in HDT (shown in Table VIII) and reduced values in apparent melt viscosity were observed in the PVC/CPVC(63.5% Cl)/SAN(18 wt. % AN) ternary alloy. This is in contrast to the CPVC/HT510 binary alloy which showed greater than predictable values in both HDT and melt viscosity (Table VII and XI). It is evident that the interaction between the CPVC(63.5%Cl) and SAN(18%AN) is of a weaker nature than that between CPVC(66%Cl) and HT510 because the benefit of the CPVC/SAN behavior is conferred on the melt properties of ternary compositions (Table XIV).

TABLE XIV

Predicted Versus Experimental Apparent Melt Viscosity Obtained at 191° C. for Ternary Alloys of PVC/CPVC (63.5% Cl)/SAN (18% AN)

| Composition by Weight | | $\eta_{app}$ P Experimental | $\eta_{app}$ P Predicted |
|---|---|---|---|
| Constant PVC | 30/15/55 | 9,780 | 28,100 |
| | 30/35/35 | 70,700 | 100,000 |
| | 30/55/15 | 223,000 | 287,000 |
| Other Compositions (PVC/CPVC/SAN) | 35/38/27 | 106,000 | 134,000 |
| | 19/21/60 | 9,220 | 28,300 |
| | 16/71/13 | 286,000 | 411,000 |
| | 68/18/14 | 84,300 | 128,500 |

In ternary alloys evidence for the values in heat distortion temperature can be found in the shear modulus behavior of these systems at higher temperatures. An example of this is shown in FIG. 1 for ternary alloys based on PVC, CPVC(66%Cl), and Blendex ® 586 (AMS/AN/S), in which the PVC concentration is held constant at 30 weight percent (Table IV). The measurements were made with a Rheometrics dynamic mechanical spectrometer at a frequency of 1 radian/sec in a temperature sweep mode. The shear moduli are shown in 5° C. increments from 80° to 95° C. This temperature range covers approximately the corresponding HDT values (85° to 96.5° C.) for this ternary alloy system.

The boundaries of the composition range depicted in FIG. 1 correspond on the left side to a PVC/CPVC(30/70) binary blend and on the right side to a PVC/586(30/70) binary alloy. If the moduli of these two compositions were linearly additive in the formation of ternary mixtures, a straight line relationship such as shown at 90° C. would be obtained. However, the results in FIG. 1 show that the experimentally measured shear moduli values clearly fall above those predicted by a linear relationship as do the HDT values (shown in Table IV).

In the following Table XV, shear moduli values are compared at 85° C. The difference (Δ) between observed and predicted values are given in the fourth column, and in the fifth column the difference is expressed as percent increase (%Δ) in modulus. Even though differences between observed and predicted heat distortion temperature values were only 2°-3° C. (Table IV) in absolute terms, they translate into much greater numerical differences (24–77%) when measured as shear modulus differences. Thus, shear moduli data, like the HDT data, demonstrate the enhanced stiffness imparted to the ternary composition by the unexpected effect of interactions between the alloying polymer and CPVC.

TABLE XV

OBSERVED AND PREDICTED SHEAR MODULI VALUES OF PVC/CPVC/(AMS/AN/S) TERNARY ALLOYS AT 85° C. PVC CONSTANT AT 30 WEIGHT PERCENT

| PVC/CPVC/586 | Observed | Predicted | Δ | % Δ |
|---|---|---|---|---|
| 30/70/0 | 2.20 | 2.20 | 0 | 0 |
| 30/50/20 | 7.60 | 4.30 | +3.3 | 77 |
| 30/40/30 | 8.32 | 5.34 | +3.0 | 56 |
| 30/30/40 | 8.66 | 6.36 | +2.3 | 36 |
| 30/20/50 | 9.16 | 7.38 | +1.8 | 24 |
| 30/0/70 | 9.45 | 9.45 | 0 | 0 |

The CPVC/PVC/alloying polymer blend can contain effective amounts, each preferably ranging from about 0.5 to about 15 parts and desirably about 2 to about 10 parts by weight, of other compounding components known to the art as well as to the literature. These can include external lubricants, stabilizers for PVC and CPVC, antioxidants, inhibitors of oxidation, and U.V. degradation as outlined in the Detail Description. Secondary stabilizers can also be used of the types and amounts given in the Detailed Description.

Inasmuch as high impact values are desired, additional impact modifiers as described in the Detailed Description can be used. The amounts of impact modifiers used can vary from about 1 to about 50 parts by weight and desirably from about 5 to about 20 parts by weight per 100 parts by weight of the mixture of CPVC/PVC/alloying polymers. These impact modified mixtures will have similar impact strengths to those described in the Detailed Description for the PVC/CPVC mixtures.

Fillers, pigments, and colorants as set forth in the Detailed Description can be incorporated into the mixture at levels from 0 to about 300 parts per 100 parts of the PVC/CPVC/alloying polymer. Plasticizers as set forth in the Detailed Description can be used at levels of less than 100 parts by weight, and preferably less than 5 parts by weight per 100 parts by weight PVC/CPVC/alloying polymers, and most preferably without plasticizer in said mixture.

The lower shear mixing methods outlined in the Detailed Description are sufficient to develop the physical properties the ternary alloys of this embodiment, although high intensity mixing followed by high shear melt blending as done for the apparent viscosity tests provides the most homogeneous mixtures and gives the most consistent physical properties.

The blended compounds of this embodiment can be processed by the fabrication techniques and into the articles specified in the Detailed Description for PVC/CPVC blends. Due to the CPVC in these blends they have higher flame retardancy than PVC. Due to the higher distortion temperatures achieved with these PVC/CPVC/alloying polymers, they have use as molded parts, shrouds, covers for machines or equipment, and parts in electrical devices, especially those requiring higher heat distortion than achieved with PVC alone and those requiring higher flame resistance than achievable with binary blends high in non-chlorinated polymers.

While in accordance with the Patent Statutes, the best mode and preferred embodiment has been set forth, the scope of the invention is not limited thereto, but rather by the scope of the attached claims.

What is claimed is:

1. An alloy of PVC, CPVC, and an alloying polymer, said alloy comprising:
   a) from about 5 to about 50 parts by weight of one or more poly(vinyl chloride) homopolymers or copolymers,
   b) from about 10 to about 85 parts by weight of a chlorinated poly(vinyl chloride) polymer, and
   c) from about 10 to about 85 parts of one or more alloying polymers to yield 100 parts by weight of an alloy,
   wherein said one or more alloying polymers are each capable of producing an enhanced heat distortion temperature or a decrease in melt viscosity or both in binary alloys of said alloying polymer with either said CPVC or said PVC,
   wherein said one or more alloying polymers each have a heat distortion temperature of at least 85° C. in ASTM D648-88 and wherein said one or more alloying polymers are homopolymers or copolymers of one or more of the following monomers:
   a) mono or disubstituted vinyl benzene wherein each substituent independently is a hydrogen or an alkyl group of 1 to 3 carbon atoms;
   b) mono or disubstituted alpha-alkylstyrene monomers wherein each substituent is independently a hydrogen or an alkyl radical of 1 to 3 carbon atoms and wherein the alkyl group in said alpha-alkylstyrene has 1 to 3 carbon atoms;
   c) acrylate monomers of the formula

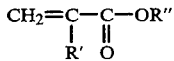

where R' is selected from hydrogen and alkyl radicals containing from 1 to 4 carbon atoms, R'' is selected from hydrogen and alkyl radicals of from 1 to 4 carbon atoms;
   d) substituted nitrile monomers wherein the substituent is selected from hydrogen and alkyl radicals having from 1 to 4 carbon atoms;
   e) acrylamides or monoalkyl or dialkyl substituted acrylamides having 5 to 11 carbon atoms; and
   f) free radically polymerizable dicarboxylic anhydrides having from 4 to 8 carbon atoms, and
   wherein said alloy has a Tg above 85° C.,
   wherein the amount of alkyl acrylates wherein R' is hydrogen in any alloying polymer is limited to from 0 to 10 mole percent,
   and with the proviso that if one of said one or more alloying polymers are copolymers essentially of alpha-methylstyrene and acrylonitrile then the amount of PVC in said alloy is 30 parts by weight or less based upon 100 parts by weight of the alloy composition.

2. An alloy according to claim 1, wherein said alloying polymers are one or more of a terpolymer of α-methylstyrene and acrylonitrile and methyl methacrylate; a terpolymer of α-methylstyrene and acrylonitrile and styrene, a polymer of partially imidized poly(methyl methacrylate), a polymer of imidized styrene-maleic anhydride, or a copolymer of styrene-acrylonitrile.

3. An alloy of claim 2, wherein said alloying polymers are α-methylstyrene-acrylonitrile-methyl methacrylate terpolymers having a composition of 40 to 85 weight percent α-methylstyrene, 5 to 19 weight percent acrylonitrile, and 10 to 40 weight percent methyl methacrylate.

4. An alloy of claim 2, wherein said alloying polymers are α-methylstyrene-acrylonitrile-styrene terpolymers having a composition of 60 to 88 weight percent α-methylstyrene, 10 to 35 weight percent acrylonitrile, and 2 to 10 weight percent styrene.

5. An alloy of claim 2, wherein said alloying polymers are partially imidized poly(methyl methacrylate) having from 10 to 60 weight percent imide groups.

6. An alloy according to claim 1, wherein the alloying polymers are a polymer or copolymer made from one or more monomers selected from styrene; alkyl substituted styrene having from 1 to 3 carbon atoms in said alkyl group; α-alkylstyrene or alkyl substituted α-alkylstyrene having from 1 to 3 carbon atoms in said alkyl group and the alkyl group of said alkylstyrene; alkyl methacrylate monomers having from 1 to 4 carbon atoms in their alkyl group; acrylonitrile; methacrylonitrile; acrylamide; α-methacrylamide; N,N-dimethylacrylamide; dicarboxylic anhydride monomers having from 4 to 8 carbon atoms; and N,N'-dibutylacrylamide.

7. An alloy according to claim 6, wherein the amount of said PVC homopolymers or copolymers is from about 10 to about 40 parts by weight, the amount of said CPVC is from about 20 to about 80 parts by weight, and the amount of said one or more alloying polymers is from about 10 to about 60 parts by weight.

8. An alloy according to claim 6, wherein the weight percent chlorine in the chlorinated poly(vinyl chloride) is from about 63 to about 70 weight percent.

9. An alloy according to claim 7, wherein the inherent viscosity of the PVC is from about 0.3 to about 1.0 and the inherent viscosity of the PVC used to make the CPVC was from about 0.3 to about 1.0.

10. An alloy of claim 2, wherein the inherent viscosity of said PVC homopolymers or copolymers and the PVC used to make said CPVC is from 0.3 to about 1.0 and wherein the amount of said PVC is from about 10 to about 40 parts, the amount of said CPVC is from about 20 to about 80 parts, and the amount of said alloying polymer is from about 10 to about 60 parts.

11. An alloy according to claim 1, wherein the alloying polymer is a copolymer of styreneacrylonitrile having an acrylonitrile content of from 10 to 32 weight percent acrylonitrile and the styrene content is from about 68 to 90 weight percent.

12. An alloy according to claim 10, wherein said alloying polymer is an imidized styrene-maleic anhydride copolymer, wherein the imide content is from 10 to 60 wt. % of said imidized styrene-maleic anhydride copolymer.

13. An alloy according to claim 1, wherein said one or more alloying polymers are each capable of producing enhanced heat distortion temperature in binary alloys of said alloying polymer with either said CPVC or said PVC.

14. An alloy according to claim 1, wherein said one or more alloying polymers are each capable of producing decreases in melt viscosity in binary alloys of said alloying polymer with either said CPVC or said PVC.

15. An alloy according to claim 1, wherein said one or more alloying polymers are capable of producing both enhanced heat distortion temperatures and reduced melt viscosity in binary alloys of said alloying polymer with either said CPVC or said PVC.

16. An alloy of PVC, CPVC, and alloying polymer, wherein said alloying polymer is capable of producing increases in heat distortion temperature or decreases in apparent melt viscosity or both in binary alloys of said alloying polymer with either said PVC or said CPVC, said CPVC alloy comprising:
a two phase alloy of PVC, CPVC, and one or more alloying polymers, wherein based on 100 parts by weight of said two phase alloy,
said PVC is from about 5 to about 50 parts by weight of one or more poly(vinyl chloride) homopolymers or copolymers,
said CPVC is from about 10 to about 85 parts by weight,
said one or more alloying polymers are from about 10 to about 85 parts by weight to yield 100 parts by weight of an alloy,
wherein said one or more alloying polymers have a heat distortion temperature of at least 85° C. in ASTM D648-88, and wherein said one or more alloying polymers are a homopolymer or copolymer of one or more of the following monomers:
a) vinyl benzene monomers optionally having one or two substituents on the benzene ring wherein each substituent can individually be a hydrogen or an alkyl group of 1 to 3 carbon atoms;
b) alpha-alkylstyrene monomers optionally having one or two substituents on the benzene ring, wherein each substituent can individually be a hydrogen or an alkyl radical of 1 to 3 carbon atoms and wherein the alkyl group in said alpha alkylstyrene can have 1 to 8 carbon atoms;
c) acrylate monomers of the formula

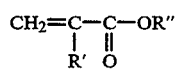

wherein R' is selected from hydrogen and alkyl radicals containing from 1 to 4 carbon atoms, R" is selected from hydrogen and alkyl radicals of from 1 to 4 carbon atoms;
d) substituted nitrile monomers wherein the substituent is hydrogen or alkyl radicals having from 1 to 4 carbon atoms,
e) acrylamides or mono or disubstituted acrylamides having from 5 to 11 carbon atoms; and
f) free radically polymerizable dicarboxylic anhydrides having from 4 to 8 carbon atoms
wherein said alloy has a Tg above 85° C.;
and with the proviso that if one of said one or more alloying polymers are copolymers of essentially alpha-methylstyrene-acrylonitrile, then the amount of PVC in said alloy is 30 parts by weight or less based upon 100 parts by weight of the alloy composition.

17. An alloy according to claim 16, wherein said PVC has an inherent viscosity of about 0.3 to about 1.2, wherein said PVC is used in amounts from about 10 to about 35 parts by weight, wherein said CPVC is used in amounts from about 20 to about 80 parts by weight, wherein said CPVC was made from PVC having an inherent viscosity from about 0.3 to about 1.0, and wherein said CPVC has a chlorine content from about 63 to about 68 weight percent.

18. An alloy according to claim 17, wherein said one or more alloying polymers are one or more of α-methylstyrene-acrylonitrile-methyl methacrylate terpolymers, α-methylstyrene-acrylonitrile-styrene terpolymers, poly(methyl methacrylate), imidized poly(methyl methacrylate), imidized copolymers of styrene-maleic anhydride, and styrene-acrylonitrile copolymers.

19. An alloy comprising PVC, CPVC, and one or more alloying polymers, wherein said alloy has a first phase and a second phase, said first phase having a major portion by weight of PVC and a minor portion of said alloying polymer and said CPVC, said second phase having a major portion by weight of CPVC and a minor portion by weight of said alloying polymer and said PVC, said alloy having a HDT which is selectively enhanced or depressed, and wherein said one or more alloying polymers are homopolymers or copolymers of one or more of the following monomers:
a) mono or disubstituted vinyl benzene wherein each substituent can individually be a hydrogen or an alkyl group of 1 to 3 carbon atoms;

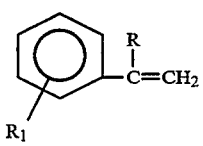

wherein R and R₁ individually represent hydrogen or alkyl groups having from 1 to 3 carbon atoms;
c) acrylate monomer represented by the structure

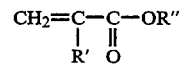

wherein R' is selected from hydrogen and alkyl radicals of 1 to 4 carbon atoms, R" is selected from hydrogen and alkyl groups of 1 to 4 carbon atoms;
d) substituted nitrile monomers wherein the substituent is hydrogen and alkyl radicals having from 1 to 4 carbon atoms,
e) acrylamides or mono or disubstituted acrylamides having from 5 to 11 carbon atoms; and
f) free radically polymerizable dicarboxylic anhydrides having from 4 to 8 carbon atoms,
wherein the amount of alkyl acrylates wherein said R' is hydrogen in any alloying polymer is limited to from 0 to 10 mole percent,
wherein said alloy has a Tg above 85° C.;
and with the proviso that if one of said one or more alloying polymers are copolymers of essentially alpha-methylstyrene-acrylonitrile copolymers, then the amount of PVC in said alloy is 30 parts by weight or less based upon 100 parts by weight of the alloy composition.

20. An alloy according to claim 19, wherein said alloying polymers have a heat distortion temperature of at least 85° C. by ASTMD648-88, and wherein said alloying polymers are one or more of a terpolymer of α-methylstyrene and acrylonitrile and methyl methacrylate; a terpolymer of α-methylstyrene and acrylonitrile and styrene; a terpolymer of partially imidized poly(methyl methacrylate), imidized copolymers of styrene-maleic anhydride and copolymers of styrene-acrylonitrile and wherein the amounts of said PVC, CPVC, and one or more alloying polymers are:
a) from about 5 to about 50 parts by weight of one or more poly(vinyl chloride) homo or copolymers,
b) from about 10 to about 85 parts by weight of a chlorinated poly(vinyl chloride) polymer, and
c) from about 10 to about 85 parts of one or more alloying polymers to yield 100 parts by weight of said alloy.

* * * * *